Sept. 4, 1945.  C. S. JONES  2,384,174
PORTABLE COMPRESSED AIR TANK TIRE INFLATOR
Filed Feb. 28, 1944
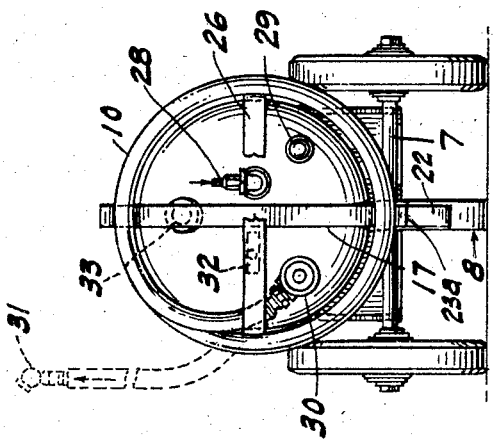
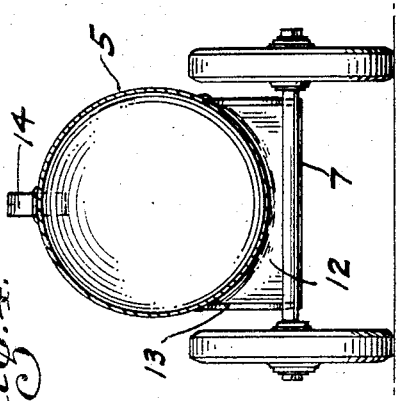
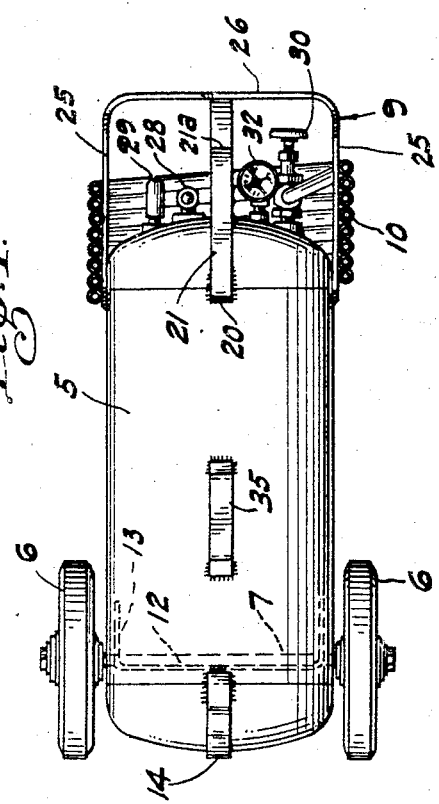
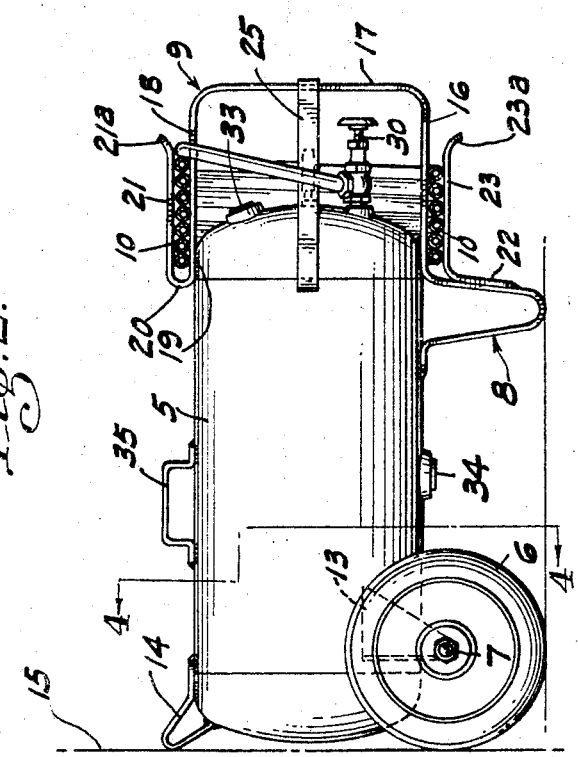
*Charles S. Jones,*
INVENTOR.
BY
*[signature]*
ATTORNEY.

Patented Sept. 4, 1945

2,384,174

UNITED STATES PATENT OFFICE 2,384,174

PORTABLE COMPRESSED AIR TANK TIRE INFLATER

Charles S. Jones, Los Angeles, Calif.

Application February 28, 1944, Serial No. 524,207

5 Claims. (Cl. 222—176)

This invention relates to a portable compressed air tank tire inflater.

In many situations where it is necessary to supply air under pressure for inflating the tires of self-propelled vehicles and aircraft it has been found inconvenient to inflate such tires quickly and satisfactorily without the use of some kind of portable means provided either with air stored under pressure or else with a power-driven air pump; because it is frequently impossible or impracticable to move the vehicles and planes having tires to be inflated to and from a stationary source of compressed air. Also, in air ports in order to maintain the tires of the wheels of airplanes, whether used for military or other purposes, in a properly inflated condition a portable means for supplying compressed air to them is of great value.

Accordingly, there has already come into use a number of portable devices provided with tanks containing compressed air to be used for vehicle tire inflation, but such devices have thus far been found unsatisfactory for various reasons, among which have been: lack of adaptability for being quickly and easily conveyed to and from points of use separated by considerable distances; lack of the sturdiness and of the long wear quality desired; failure adequately to protect against breakage, wear and strain of the more delicate portions of such devices, such for example, as valve-operating means and air pressure indicators; and lack of facility for being advantageously used in a constricted space, as for example under wings of aircraft or between trucks or cars while they are parked close together or being serviced in garages or other like situations.

It is among the objects of this invention to overcome the aforementioned defects and undesirable conditions by providing a manually propellable and manually operable device having a pair of ground wheels and provided with a tank large enough to contain an adequate quantity of compressed air, said tank being equipped with quickly and easily operable valve carrying means for delivering the compressed air to tires to be inflated.

Another and more specific object is to provide, in conjunction with the handle means used in wheeling the device from place to place, an improved guard structure positioned to protect certain delicate parts including the air dispensing, air intake fitting and air pressure gage with which the device is equipped, this protective feature being enhanced by the fact that said guard structure forms a skeletal frame upon which the air hose is windable, said hose, when wound upon said frame, being in a surrounding relation to, and therefore adding to the protection of, the aforesaid parts which need to be protected against rough usage or breakage.

Another object is to provide improved means for supporting the tank either in a horizontal position or in an upstanding space economizing position.

Other objects, advantages and features of invention will hereinafter appear.

Referring to the accompanying drawing, which illustrates what is at present deemed to be a preferred embodiment of the invention, Fig. 1 is a plan view of the device, the tank being horizontally positioned.

Fig. 2 is a side elevation thereof showing how the tank appears both in its horizontal and upstanding positions.

Fig. 3 is a rear end elevation of the device, a part of the handle bar being broken away in order to show the intake valve fitting more clearly.

Fig. 4 is a cross section on angular line 4—4 of Fig. 2.

Referring in detail to the drawing, important parts of the portable device shown are the compressed air tank 5, pair of ground wheels 6 carried by an axle 7 which underlies the tank near one of its ends, the leg 8 which extends from the same side of the tank near its opposite end, and a spider-like frame or extension 9 which projects from the latter end of the tank upon which the air delivery hose 10 is windable.

The axle 7 is shown secured to the front end portion of the cylindrical tank 5 by means of a bracket formed as an upstanding plate 12 having a generally triangular, backwardly directed flange 13 at each end. Said flanges 13 taper downwardly and are truncated at their lower ends adjacent to which they are apertured to receive the end portions of the axle 7, the upper end portions of these flanges extending along and being welded to side portions of the tank 5. Along its upper edge the bracket 12 is concave with a concavity which spans the space between the flanges 13 and is contoured to fit snugly against the lower portion of the cylindrical tank 5. Also the bracket has its concave edge portion secured to the tank by welding and welds are provided to secure the axle 7 to the bracket where it passes through the latter.

A foot piece 14 is shown welded to the upper side of the front end of the tank in a position to cooperate with the wheels 6 to support the tank when it is tilted to an upstanding position in relation to the floor or ground surface indicated at 15.

The already mentioned leg 8, located at the rear end of the tank, is shown as a downwardly directed loop made in one end portion of a long strip of rigid metal, said strip having a backwardly directed run 16 which forms the lower side portion of the already mentioned spider-like frame 9. At its rear end said run 16 is directed upwardly to form a back run 17 which, in turn, is directed forwardly as a top run 18, the forward portion of which is welded to the tank at 19. Beyond this weld said strip is looped backwardly at 20 which joins on its terminal run 21, the latter run being in a parallel spaced relation to the run 18 so as to form an upper keeper for the wound-up hose 10. At the opposite side of the tank an angular metal strip is shown having one of its limbs 22 welded to the rear run of the leg 8 and its other limb 23 extending in an adjacent, parallel relation to the aforesaid run 16 to provide a lower keeper for the hose 10.

In addition to the U-shaped member the base of which is formed by the run 17 and the limbs of which are formed by the runs 16 and 18, another U-shaped member is provided in order to complete the spider-like frame 9. This latter member consists of a rigid strip of metal comprising twin limbs 25 and a basal run 26, the basal runs of the two U-shaped members centrally overlapping, where they are preferably welded or otherwise secured together.

The means which has been described for keeping in place the wound-up hose may be varied in its details without exceeding the scope of the claimed invention, but it is deemed that the best way to construct said means is to rebend at least one limb of one of the U members in such a way that it extends in a parallel, outwardly spaced relation to the U limb of which it forms a part, and also to provide a corresponding keeper for the opposite side of the U, it being obvious that both of keepers could be made by rebending the terminal portions of the limbs 25 of the U member shown extending horizontally in Fig. 2.

In order to facilitate winding up and unwinding of the hose the keeper run 21 is shown having an outwardly deflected tip 21a at its open side, a like deflected tip 23a being provided on the keeper run 23.

It will be seen that the first described U member lies in a vertical plane when the tank is supported in a horizontally extending position, and that, at such time, the other U member lies in a horizontal plane, thus adapting its basal run 26 to be manually grasped at each side of the center to propel the device after the fashion of a wheel-barrow or truck.

An intake valve fitting 28 similar to those used on pneumatic tires, and a safety valve fitting 29 are shown attached to the rear end of the tank, this safety valve ordinarily being set to relieve the pressure within the tank when it exceeds 200 lbs. per sq. in. Also, a valve fitting 30 is shown attached to the rear end of the tank to deliver compressed air from the tank to the dispensing hose 10 which is furnished at its free end with a conventional applicator air chuck 31 to cooperate with the air valves of tires.

An air pressure gage 32 is also shown attached to the rear end of the tank. Hence it will be seen that the safety valve 29, air dispensing fitting 30 and gage 32 are all so positioned as to be protected by the spider-like frame 9, this protection being normally made very complete by reason of the surrounding sheath afforded by the wound-up hose.

The tank is shown having upper and lower inspection openings which are respectively normally closed in a fluid tight manner by plugs 33 and 34. Also, a hand-hold 35 is shown in Figs. 1 and 2 attached to the upper side of the tank, to aid in bodily carrying the device when its size will permit.

The labor and cost of manufacturing the device are small in comparison with most others of its class having equal capacity and similar function. This results from the fact that no frame or special chassis is provided to support the tank, but the tank itself for the most part takes the place of a connecting means between the ground wheels and the handle means which the operator uses in wheeling the tank from place to place.

Owing to the compact character of the device a large number of them can, after being filled with compressed air, be transported to an airfield or other place of use upon a single truck. Also a considerable number of them can be readily carried by an airplane or glider. The air pressure in the tank may be replenished from an air flask, a compressor or conventional hose in a filling station.

The use of the device to inflate the tires of aircraft is among the most important features of the invention, because it reduces the labor and expense which has heretofore often been required by wheeling the planes to an air hose connected to a compressor. Moreover, this invention expedites tire inflation in the case of the larger planes, for heretofore their tires have often been inflated from hoses mounted on trucks which carry air compressors. Also this invention can be used to a great advantage to inflate the tires of stranded planes and of planes which have made forced landings, it being possible by using parachutes to drop the device down from carrier planes sent to rescue the crews of such stranded planes.

In using the device the operator will wheel it about after the fashion of a wheel-barrow or hand truck, thereby conveying it to a point near the tire or tires to be inflated. During use the tank may be sustained in the horizontal position shown in Fig. 2 or it may be used in an upstanding position wherein it is supported by the floor or ground surface indicated by 15 in said view. Even when the tank is made approximately three feet in length and one foot in diameter, if filled with air under 200 pounds pressure, it can be used to inflate from 15 to 20 vehicle tires of the average size. The device will ordinarily be filled with compressed air at approximately 200 pounds pressure.

During propulsion of the device the instruments which need protection are shielded not only by the skeletal frame 9 but also by the hose 10 wound around said frame. The hose will not be removed from its protecting situation except when the device is at rest ready for actual use, and when the device is at rest there will be no special danger of breakage of the parts to be protected. Hence the hose provides additional protection for the parts to be shielded during all the time when this protection is essential.

It will be seen that, when the device is not in use it may be placed in the upstanding position upon the floor line 15 (Fig. 2), in which position it will occupy but little floor space. The ground wheels 6 and foot 14 are so positioned that the tank is at such time supported in an upwardly spaced, adjacent relation to the floor. The foot 14 is not only useful for the purpose just stated, but also acts as a bumper to guard the tank against injury when the device is being wheeled about.

It should be understood that the present disclosure is for the purpose of illustration only and that this invention includes all modifications and equivalents which fall within the scope of the subject matter claimed.

What is claimed is:

1. In a device of the kind described, an elongated tank to contain compressed air having a pair of ground wheels attached to it at one end and a leg attached to it at its opposite end to cooperate with said wheels to at times support said tank in a horizontal position, said tank being tiltable to an upstanding position with its wheel-carrying end directed downwardly, and two generally U-shaped strips of rigid material each having the outer end portion of its limbs forwardly directed and attached to opposite sides of the rear end portion of said tank, when the tank is in the horizontal position one of said U-shaped strips lying in a substantially vertical plane and the other strip at such time lying in substantially a horizontal plane and having its basal portion positioned for use as a handle means to be manually grasped to propel the tank upon its wheels in a wheel-barrow fashion, an air outlet fitting attached to said tank, and a flexible air delivery hose attached to said fitting, said hose being windable around the four-armed spider or frame formed by the aforesaid two U-shaped strips, said air outlet fitting being attached to an end portion of the tank in a position to be protected by the forward portions of said U-shaped strips and to be additionally protected by said hose when it is wound around the cooperating limbs of said cooperating U-shaped members as aforesaid.

2. In combination, an elongated closed-in sheet metal tank which forms the body portion of a vehicular structure, a leg secured to one end portion of said tank, said leg consisting of an out-bent portion of a rigid strip of metal which is secured to longitudinally spaced apart portions of the tank at each side of said out-bent portion, that secured portion of said strip which is nearest to said one end of the tank being continued to form a run which projects rearwardly of the tank and then being continued to complete a U-member having its limbs secured to opposite sides of the tank and its basal run spaced rearwardly from said one end of the tank, and a second U member having its basal portion positioned in an adjacent cruciate relation to the first recited U member and its limbs secured to opposite side portions of the tank, at least one of said U members having in an outwardly spaced approximately parallel relation to each of its limbs a guard bar to aid in keeping in place an air delivery hose for said tank wound around the four limbs of the U members.

3. In combination, an elongated, closed-in sheet metal tank which forms the body portion of a vehicular structure, a valve controlled air delivery hose connected with said tank, a leg secured to one end portion of said tank, said leg consisting of an out-bent portion of a rigid strip of a metal which is secured to longitudinally spaced apart portions of the tank at each side of said out-bent portion, that secured portion of said strip which is nearest to said one end of the tank being continued to form a run which projects rearwardly of the tank and then being continued to complete a U member having its limbs secured to opposite sides of the tank and its basal run spaced rearwardly from said one end of the tank, a second U member having its basal portion positioned in an adjacent cruciate relation to the first recited U member and its limbs secured to opposite side portions of the tank, at least one of the limbs of one of said U members having a terminal run which is rebent and positioned in a parallel, outwardly spaced relation to such U member to form a keeper for the aforesaid hose when the latter is wound around the four limbs of the two U members, and a correspondingly positioned keeper bar for the opposite limb of the latter U member.

4. In a device of the kind described, an elongated enclosed cylindrical metal, high pressure tank to contain compressed air having a dome head at each end, a plate-like bracket secured to said tank and having a concave edge portion which abuts in a right angular manner against said tank near one end thereof, an axle secured to said bracket in a transversely extending relation to the tank, a ground wheel carried by each end portion of said axle, and a combined supporting foot and bumper carried by the side and end portion of the tank opposite to said axle and at the same end of the tank therewith to guard that domed end of the tank against injury when the device is being wheeled about, said foot and ground wheels being positioned to cooperate to sustain the tank in an upstanding position upon a horizontal surface with the dome end of the tank nearest said wheels in an adjacent, upwardly spaced relation to such surface when the tank is canted to a vertical position, said plate-like bracket having at each end a deflected corner portion forming a flange an edge portion of which extends along the side of the tank and is welded thereto.

5. In a device of the kind described, an elongated tank, two generally U-shaped strips of rigid material each having the outer end portion of its limbs forwardly directed and attached to opposite sides of one end portion of said tank, when the tank is in the horizontal position one of said U-shaped strips lying in a substantially vertical plane and the other strip at such time lying in substantially a horizontal plane and having its basal portion positioned for use as a handle, an air outlet fitting attached to said tank, and a flexible air delivery hose attached to said fitting, said hose being windable around the four-armed spider or frame formed by the aforesaid two U-shaped strips, said air outlet fitting being attached to an end portion of the tank in a position to be protected by the forward portions of said U-shaped strips and to be additionally protected by said hose when it is wound around the cooperating limbs of said cooperating U-shaped members as aforesaid, at least one of said U members having in an outwardly spaced approximately parallel relation to each of its limbs a guard bar to aid in keeping in place an air delivery hose for said tank wound around the four limbs of the U members.

CHARLES S. JONES.